US006174588B1

(12) United States Patent
Nordvik

(10) Patent No.: US 6,174,588 B1
(45) Date of Patent: Jan. 16, 2001

(54) HEAT PROTECTION ELEMENT

(76) Inventor: Atle Bjørn Nordvik, 2230 Central Ave., Vienna, VA (US) 22182

( * ) Notice: Under 35 U.S.C. 154(b), the term of this patent shall be extended for 0 days.

(21) Appl. No.: 09/381,240

(22) PCT Filed: Mar. 19, 1998

(86) PCT No.: PCT/NO98/00086

§ 371 Date: Nov. 29, 1999

§ 102(e) Date: Nov. 29, 1999

(87) PCT Pub. No.: WO98/41285

PCT Pub. Date: Sep. 24, 1998

(30) Foreign Application Priority Data

Mar. 19, 1997 (NO) .................................................... 971259

(51) Int. Cl.[7] ................................ B32B 3/20; B27N 9/00; A63H 3/46; A63H 5/00; B32D 3/10

(52) U.S. Cl. .......................... 428/188; 428/920; 428/921; 428/131; 428/137; 428/138; 442/381; 442/391; 442/414; 62/136

(58) Field of Search .................................... 428/920, 921, 428/304.4, 212; 442/381, 390, 391, 405, 414, 416

(56) References Cited

U.S. PATENT DOCUMENTS

| | | | | |
|---|---|---|---|---|
| 3,049,896 | * | 8/1962 | Webb . | |
| 3,768,118 | * | 10/1973 | Ruffo et al. | 19/156.3 |
| 4,112,921 | * | 9/1978 | MacCracken | 126/271 |
| 4,172,454 | * | 10/1979 | Warncke et al. | 128/142.5 |
| 4,467,005 | * | 8/1984 | Pusch et al. | 428/111 |
| 4,537,822 | * | 8/1985 | Nanri et al. | 428/212 |
| 4,601,943 | * | 7/1986 | Haushofer et al. | 428/246 |
| 4,612,239 | | 9/1986 | Dimanshteyn | 428/246 |
| 4,619,553 | * | 10/1986 | Fischer | 405/63 |
| 4,914,752 | * | 4/1990 | Hinson | 2/2 |
| 5,063,923 | * | 11/1991 | Peroni | 128/201.13 |
| 5,188,624 | * | 2/1993 | Young, Sr. et al. | 604/378 |
| 5,243,706 | * | 9/1993 | Frim et al. | 2/2 |
| 5,379,610 | * | 1/1995 | Yano | 62/316 |
| 5,415,155 | * | 5/1995 | Cohen et al. | 126/663 |
| 5,421,400 | * | 6/1995 | Yano et al. | 165/46 |
| 5,486,408 | * | 1/1996 | Sentendrey | 428/220 |
| 5,774,902 | * | 7/1998 | Gehse | 2/458 |

FOREIGN PATENT DOCUMENTS

| | | | |
|---|---|---|---|
| 0 458 560 B1 | 10/1994 | (EP) | E04B/1/94 |
| 2070927 | 9/1981 | (GB) | A62C/7/00 |
| 04024030 | 1/1992 | (JP) | A62C/2/00 |

* cited by examiner

*Primary Examiner*—Blaine Copenheaver
*Assistant Examiner*—Christopher C. Pratt
(74) *Attorney, Agent, or Firm*—Nawrocki, Rooney & Sivertson, P.A.

(57) ABSTRACT

Fire and heat protective flexible web, comprising a flexible material. The web comprises, in a cross section view from the heat exposed side:

a selected first support layer (1) consisting of a steam permeable, solid and tear resistant textile, one or more fluid transporting layers (2) consisting of a liquid permeable and airy textile, a selected second support layer (1) consisting of a steam permeable, solid and tear resistant textile, and a conduit (6) mounted at least in the upper part of the fire projective web, for supply of fluid to the fluid conducting weblayer, and to disperse the fluid evenly in the longitudinal extent of the web, whereby the different layers are tightly connected surface-to-surface by means of seams, adhesives, point fixing or similar.

12 Claims, 1 Drawing Sheet

HEAT PROTECTION ELEMENT

The invention relates to a flexible heat and fire protective web of the type presented in the preamble portion of the attached claim 1.

BACKGROUND

Fire inhibiting structures, in particular fire inhibiting carpets which can be laid over existing conventional oil retaining structures are know. These fire resistant carpets and other fire resistant materials are often made of ceramic fiber materials or woven materials which can withstand high temperature. The materials are often combined with metals which have good heat conducting properties.

A disadvantage concerning materials which contains metals, is that they have a tendency to oxidize/corrode when sea water is present, and their structure changes and weakens when heated.

There are exit barriers which contain both solid and air filled flexible emergency buoy-ancies. Fire restraining barriers containing solid emergency buoyancies can not be coiled in or payed out from a reel. This makes handling difficult and demands a lot of extra work, which constitutes a danger for the barriers. Barriers with flexible floating chambers have little freeboard and spare buoyancy, and therefore there is a chance that they might go down under water during normal tug speed.

The barriers available today are expensive and heavy, and are made up of materials with limited life during a fire, where temperatures in the fire may vary between 800–1300° C. The fire barriers generally have a low buoyancy/weight ratio compared to normal barriers. This causes them to float heavily in the sea, and have poor wave following properties, ans this creates weather-dependent use in open waters. In addition the materials are rigid, and not very flexible, which results in a worsening of the sea-properties.

OBJECT

The object of the invention is to provide a fire and heat protective web which eases or overcomes the disadvantages of known fire protective devices and extinguishing methods.

THE INVENTION

The object is accomplished with a flexible heat and fire projective web according to the characterising portion of claim 1, and a use of the same according to claim 6. Further advantageous features are given in the dependent claims.

The invention relates to a fire and heat protective, usually flexible, web, which is characterised by comprising, in a cross section of the web from the heat exposed side:

- a selected first support layer consisting of a steam permeable, compact and tear resistant textile web,
- one or more liquid conducting layers of a liquid permeable and airy textile material,
- a selected second support layer consisting of a steam permeable, compact and tear resistant textile web, and
- a conduit mounted at least in the upper part of the fire protective web, for supply of fluid to the fluid conducting weblayer, and to disperse the fluid evenly in the longiudinal extent of the web, whereby the different layers are tightly connected surface-to-surface by means of seams, adhesive means, point fixing or similar.

Although the invention in the following description is, for simplicity, described with special reference to use concerning oil barriers at sea, it should be obvious to a person skilled in the art that the fire protective web can be used for other applications, as will be demonstrated in the following further detailed description.

The fire and heat protective effect resulting from the web according to the invention, arises as a result of a combination between active and passive cooling, in the form of a fluid which flows through the porous and fluid permeable textile material. Before and during use of the web according to the invention, water or another nonflammable fluid is added, through a perforated water tube. Fluids which have boiling points similar to sea water, or are adjusted to the textiles' resistance to heat, can be used.

Temperature control of the web according to the invention, both inside and on it's surfaces, takes place according to the following principle: When a fluid boils, the temperature in the fluid adjusts to it's boiling point, and thereby automatically limits the maximal temperature in the web. The temperature and the evaporation from the surface of the water, stays constant during boiling, and is therefore independent of the temperature of the fire or source of heat. The maximum temperature in the wet fire protective web is therefore 100° C., if the fluid used is water. The minimum amount of water needed to keep the temperature below the boiling temperature, is equal to the amount which evaporates from the web. By increasing the waterflow, further cooling will be achieved.

The term "fluid permeable and airy textile material", used about the fluid conducting layer, means any textile material, comprising synthetic and/or natural fibres which shows a high capacity to absorb water and a high waterflow capacity, e.g. woven, non-woven and needle cloth of e.g. cotton.

For cloth materials with relatively low inherent strength, e.g. non-woven cloth, it is preferred to combine it with a support layer on one, or preferably both sides. The selected support layer will, in addition to a protective and supporting function, also serve to keep the cooling fluid which flows in the fluid conducting layer, better in its place, and also makes the cooling fluid available to the heat exposed side of the web.

The support layer may comprise materials which correspond to the fluid conducting layer, but it will have a denser structure with higher resistance to tearing, and a lower capacity for flow of fluid. The support layer still shows a capacity to exchange steam between the surroundings and the fluid conducting layer.

In the simplest embodiment, the web includes, an extended horizontal conduit, e.g. in the form of a perforated and flexible tube, at the upper end of the web, to provide an even supply of cooling fluid along substantially the whole length of the web. In cases where the web is very large, or very intense heat exchange is expected, it could be conceivable to provide horizontally conduits, generally parallel with each other, extending downwards in the web, to replace cooling fluid which has evaporated at the upper side of the web.

At the least heat exposed side of the web, may be mounted a block layer with steamblocking and eventually heat leading qualities, e.g. a plastic film like PVC, or flexible metalfoils, e.g. aluminium, so that eventually absorbed heat can be spread out if needed. Such a block layer will prevent eventually evaporation of fluid on the cool side, and also prevent draining of cooling fluid from the fluid conducting layer, and in this way, even more cooling fluid available to the heat exposed side of the web.

A typical thickness of the web according to the invention will be about 2–4 mm, which gives a dry weight of about 300–400 g/m$^2$ and a wet weight of about 1000–3000 g/m$^2$. Thickness, layer construction, and implementation of conduits will of course have to be adjusted to the intended use, and will vary from very simple constructions for some applications, to more complicated constructions for larger applications.

The method for mutual fastening of the different web layers in the web according to the invention, is not essential, but the different layers should be surface-to-surface with each other, to make sure that the whole web gets moistened by the supplied cooling fluid. Consequently, the different web layers can be fastened to each other by e.g. a stable adhesive means, point fixing or by seams. When fastening with seams, the seams must be established generally parallel and vertical considering the web's position during use, so that there will be established vertical channels supplying the flow and spread of water in an even way in and over the web according to the invention. Tests have proven that an advantageous distance between the seams is about 5–10 cm.

The ratio between active and natural flow of water varies according to the choice of textiles and cloth materials. Tests have proven that a web according to the invention with active cooling can receive about 240 times more water per time and area, than the amount with natural cooling per time and area. This offers the possibility to cool down towards the temperature of the cooling water.

To combine water and air cooling, it is possible to mount a distancing means inside the web (the least heat exposed side), to allow cooling and condensation of steam which is localised between the web and the product, or the object to be protected.

To sum up, to gain even dispersion of temperature in the web according to the invention, both the absorbing and flow through properties of the textile and the selected block layer's steam blocking and heat conducting properties are utilized. These properties are necessary to 1) compensate for evaporation,
2) reduce evaporation and salt deposit by lowering the temperature of the web and surface,
3) protecting products with a lower temperature resistance than 100° C.
4) rinse salt created during evaporation of sea water, and
5) prevent passage and heating of water vapour on the cold side of the web.

The web according to the invention is particularly suited for use, with or as, oil barriers. The flash point of the oil increases with time after spill at sea. Oils with a flash point higher than the surface temperature of the web, will not be set on fire or be able to burn on the surface of the web. Active cooling will reduce the temperature of the surface of the web down towards the temperature of the cooling fluid. Active cooling or the extent of active cooling can thereby be regulated to avoid crude oil e.g. burning in the web. If the dry web is moistened with oil, the oil will partly flow off and at the same time emulsify in the web, when it is used active cooling. This property protects the web from catching fire, because emulsified oils do not burn until the water is evaporated. Steady supply of water will therefore prevent the emulsion from evaporating.

Since the material has an ability to conduct fluids, the water can be supplied with fire lather for further cooling or improvement of fire protective properties. The principle can also be used for supply of oil repellant chemicals. The web material will then function as a chemical barrier, holding the oil away from the web surface. Water will flow through the material, and the web will function as an oil/water separator.

For simpler cleaning; chemicals/soaps can be added to the water.

To protect conventional barriers with a low buoyancy/weight ratio, the carpet may be equipped with installed longitudinal air filled tubes on each side of the barrier.

In addition to use as heat shields and fire restrictive protections for barriers, the web can also be used in other industrial operations. For example as fire protection for storage tanks of oil or gas at refineries, or protection of personnel in residential areas at gas or oil rigs, hotels, housings and vessels. The material and the method can also be used in textiles and work clothes for protection of fire crews and for extinguishing of fire engines or fires of limited dimensions.

The invention in the following detailed description will be described with reference to the accompanying drawings, where:

Figure 1:
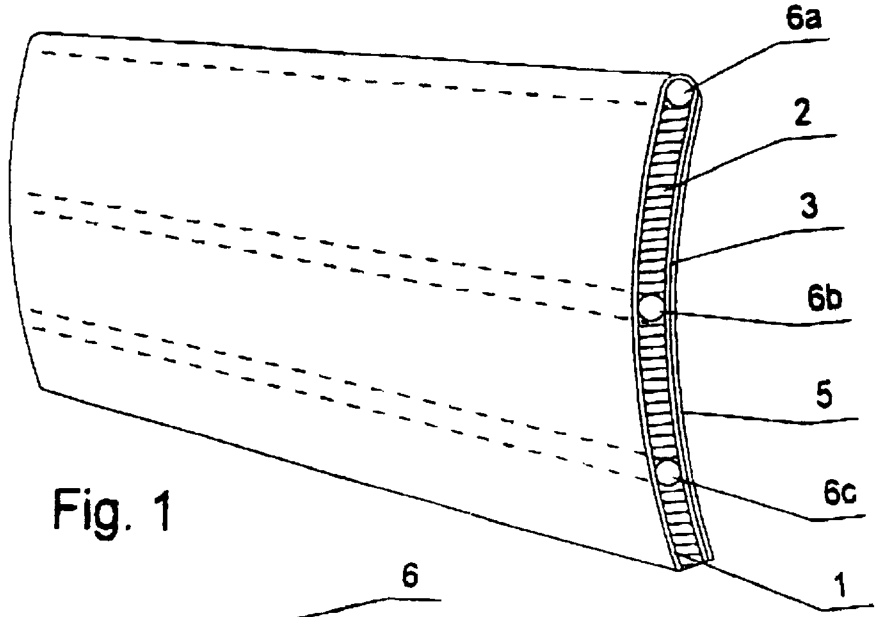
FIG. 1 shows an embodiment of a web according to the invention.

FIG. 1 shows a perspective view, partly sectioned, of an example of an embodiment of the web according to the invention. The web comprises a support layer 1 localised against the heat exposed side, a fluid conducting layer 2 brought surface onto surface with the first support layer, a second support layer 3 and finally a blocking layer 5. Perforated conduits (6*a*, 6*b*, 6*c*) are located between support layer 1 and 3, and provides a water supply to the whole length of the web by means of a pump or a fall reservoir.

Figure 2:
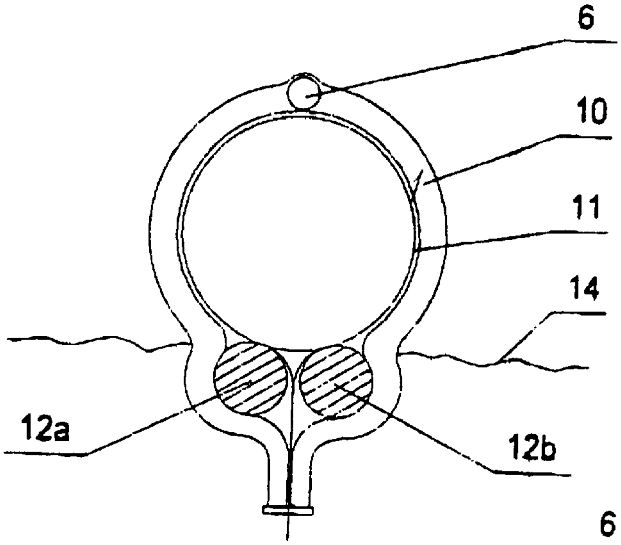
FIG. 2 shows an embodiment in which the web is arranged to protect an existing oil barrier.

FIG. 2 shows a sectional view through an exiting oil barrier 11, which floats on the sea surface 14. A web 10 according to the invention is placed around the oil barrier 11, and is, at its lower end equipped with emergency buoyancies 12*a* and 12*b*. A perforated conduit 6 is located at the upper end of the web in the drawing, to provide a water supply. The emergency buoyancies 12*a* and 12*b* will compensate for the increasing weight, and at the same time give the barrier itself an increased buoyancy, thereby improving the buoyancy/weight ratio and the wave following properties. The web according to the invention, can thereby be used with all existing types of barriers, including those which have previously too low a buoyancy to be used in open waters.

Figure 3:
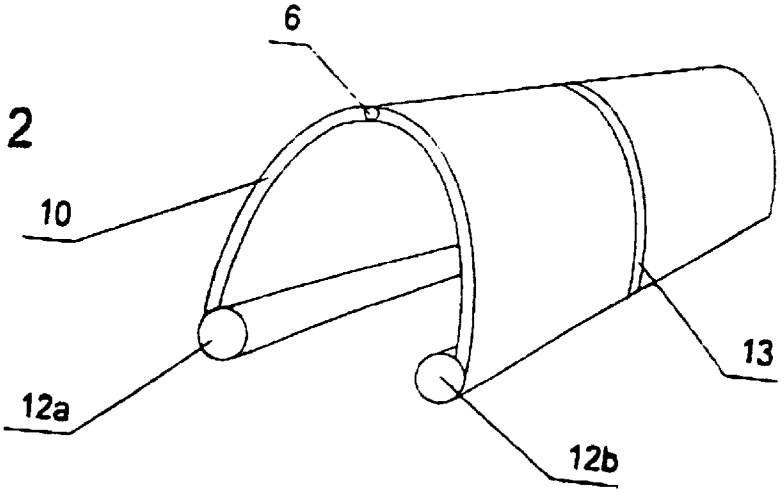
FIG. 3 shows use of the web as an oil barrier.

FIG. 3 shows a web 10 according to the invention, in the shape of a independent oil barrier with support from emergency buoyancies 12*a* and 12*b* placed at each free longitudinal edge, and ribs 13 of spring steel or similar which shape and keep the web up, even without the use of air filled or solid emergency buoyancies, which are necessary for normal barriers.

EXAMPLE 1

Multi Layer Web

Tests with a 0.2 m×0.28 m web incorporating a relatively hard cloth (non-woven) as a fluid-carrier, with a layer of a cotton textile on each side, have proven that if the web is laid over a propane flame, assumed temperature of the flame is about 700–750° C., the surface temperature on the cold side will vary from 9–87° C., and on the hot side the temperature will be 10–12° C. higher, depending on the temperature of the cooling water and the amount of cooling water which flows through the web. The prototype has been used for a total of 12 hours burning over the propane flame from a cooker, without getting visible marks or weakening the properties of the material.

Tests with lubricating oil and evaporated crude oil emulsion on the web's hot side, after being moistened with water, gave no marks or visible damage to the web after over 1 hour of burning.

Also performed were tests in which the web in a dry condition was moistened with lubricating oil, and afterwards supplied with cooling water, as described earlier. After 2 hours of burning over a propane flame there was no visible damage or marks on the web.

EXAMPLE 2

One Layer Web.

Tests were also performed on a web comprising only one layer of cotton cloth with thickness 1 mm, and side lengths 22.5×29.5 cm. The flow capacity of the web was 28 mL water/min. The flow capacity was measured by placing one edge of the web in a tub with water, and the other end over the tub-edge so that the free end was below the water surface in the tub. The flow capasity was then determined by measuring the amount of water which flowed out of the free end of the web. The absorptiveness of the web was measured by weighing the web when it was dry, and when it was fully moistened. The resulting value for this web was 10 kg (dry web and water) per kg dry web.

The web was continuously supplied with cooling water through a conduit along the upper end of the web, after which a weld flame (propane/oxygen) was directed against it's surface.

Even after 5 min heating it was not possible to observe any visible damage to the web. Consequently, this shows that the web according to the invention also exhibits the desired effect even with just one layer.

Accordingly, the invention provides a new heat and fire protective web with improved properties compared to known fire protecting means: The special properties of the web together with the cooling principle, makes the temperature in the web independent of the temperature of the heat source. The water film which forms on the surfaces of the web, prevents soot from settling. Chemicals, water and fire lather can be pumped through the web to ease cleaning and to supply further fire resistant effect, if desired. Lubricating oil which fixes to the web will be rinsed off during use in a fire.

The web material has a low weight when it is not moistened. This leads to simpler handling and mounting compared to existing fire restraining carpet materials which are used. The material is more flexible, both when dry and wet, than other materials which are used, and therefore affect the sea properties to a lesser degree.

When the web is supplied with its own emergency buoyancies, the weight increase during operation is compensated, and in addition the spare buoyancy will increase the buoyancy of existing conventional barriers. This increases the utilization possibilities for this kind of product.

The web will be cheaper to purchase than existing fire restraining products. This is because the web has longer operational lifetime under a fire, and do not decompose substantially from the temperature of a fire. Existing equipment for mechanical collection of oil can be used for pumping water.

The web according to the invention can be coiled on a reel, together with the barrier which it shall protect. This greatly reduces the response time and simplifies postponement and handling.

The web according to the invention will provide greater flexibility in choice of existing textiles, because the maximum temperature using sea water as the cooling media, automatically restricts it to about 100° C. This results in a greater freedom for design of the product, and can therefore easily be adjusted to use in other fields.

The web according to the invention may be used as fire protection in many applications. The product is environmental friendly and will not release any form of poisonous gases, when it is exposed to high temperatures. It is maintenance-free and does not contain any metals which may corrode when it is in touch with water or if any chemicals are used. It has insulation material to further improve the insulation property.

To protect special objects from ultraviolet radiation, in combination with this web a e.g. aluminium foil may be used. Other materials can also be used for this purpose. The thickness of the web will typically vary between 2–4 mm. This gives a dry weight of <0.5 kg/square metre. The wet weight will vary with the thickness and the textiles' properties for absorbing water, and is normally between 1–3 kg per square metre.

If the web is permanently fixed to existing constructions, no extra installed textile strength is needed. To resist unexpected fires, before the water cooling is initiated, and to avoid damage to the textiles in vulnerable areas, the web can be provided with an outer mechanical protection. If the web is used as a mobile fire protection, the strength can be varied by choosing armoured textile combinations. The combination web can further be equipped with ribs and shaped as a temporary "evacuating tent". Since the web can be built up solely of textiles, it will not corrode, and the structure in the web will not weaken under heat-influence, even with temperatures up to 3000° C. For mobile use, the web can easily be handled with it's low weight, and stored and set out in reels.

The web according to the invention has been tested in fires with oil, but the properties of the product have not been affected. If the web is moistened with oil and the water is switched on afterwards, the oil will be displaced by the water. Oils with a higher flash point than the surface temperature of the web, will not be set on fire or bum on the surface of the web.

The web according to the invention has the following advantages as a fire protection equipment:

- the boiling point of the water limits the maximum temperature on the surfaces of the textile,
- extended possibility to protect existing constructions with low resistance to fire,
- increased flexibility in choice of building materials demanding fire protection,
- low consumption of water,
- it can be connected to an existing sprinkler system,
- optimum protection—water is supplied where it is needed,
- low weight when it is dry,
- low production costs,
- independent of temperature and heat radiation,
- over time, it resists unlimited temperature and heat radiation,
- environmental friendly product,
- produces no poisonous gasses during use,
- maintenance free and long lifetime,
- no corrosion,
- flexible basic material—can be coiled on a reel for mobile use,
- cheap to purchase,
- inbuilt possibility for lather laying.

There exists many areas for use both ashore and at sea where the invention can be used to increase fire-safety, including the possibility for fire extinguishing and improvement of safety for personnel. Some of these topical areas are:

oil barriers,
fire walls,
oil rigs,
protection for burning off gases (replaces flare stacks),
residential areas in floating and stationary installations,
escape routes,
control room,
storage tanks for oil, gas and chemicals,
computers and computer centrals,
libraries,
museums,
mobile heat shield for fire extinguishing,
carpet for fire extinguishing,
protection of mobile fire means (cars etc.),
fire suits,
ammunition storages/rooms,
fire cupboards.

What is claimed is:

1. Fire and heat protective web equipped with means for feeding liquid to the web, wherein a cooling-effect is established, the protective web comprising, in a cross section view from the heat exposed side:

a selected first support layer (1) consisting of a steam permeable, compact and tear resistant textile material, one or more fluid conducting layers (2) of a liquid permeable and airy textile material, a selected second support layer (3) consisting of a steam permeable, compact and tear resistant textile material, and at least one conduit (6) mounted in fluid communication with at least one fluid conducting layer for supply of fluid to the fluid conducting layer and to disperse the fluid evenly in the longitudinal extent of the web, whereby the different layers are tightly connected surface-to-surface.

2. Web according to claim 1, wherein at least one of said support layers (1, 3) comprises a thin and dense textile of absorbing fibres.

3. Web according to claim 2, wherein said thin and dense textile of absorbing fibers is a cotton textile.

4. Web according to claim 1, wherein the conduit (6) is perforated and generally flexible and integrated in and generally arranged along the upper part of the fire protective web, wherein the perforations are evenly distributed along the whole length of the conduit, and incorporated into, or in connection with the web.

5. Web according to claim 1, wherein an impermeable foil (5) is placed between said one or more fluid conducting layers and said second support layer.

6. Web according to claim 1, wherein a plurality of conduits (6*a*, 6*b*, 6*c*) are provided in connection with the web, and they are generally parallel to each other.

7. Web according to claim 1, wherein said web further comprises an impermeable thermal insulating foil, which is fixed surface-to-surface with the unexposed side of the fluid conducting layer.

8. Web according to claim 1, wherein said web is arranged in an upwardly arched configuration forming an upper part in the center of the web and wherein said conduit is mounted at least in the upper part of the fire protective web.

9. Web according to claim 1, wherein an impermeable foil is attached to the outside surface said second support layer, thereby making the foil the farthest surface from the heat exposed surface of the web.

10. A web which comprises, in a cross section view from the heat exposed side:

a selected first support layer (1) consisting of a steam permeable, compact and tear resistant textile material, one or more fluid conducting layers (2) of a liquid permeable and airy textile material, a selected second support layer (3) consisting of a steam permeable, compact and tear resistant textile material, and at least one conduit (6) in fluid communication with at least one fluid conducting layer for supply of fluid to the fluid conducting layer and to disperse the fluid evenly in the longitudinal extent of the web, whereby the different layers are tightly connected surface-to-surface, as a fire protective web for oil barriers, for covering storage tanks which stock flammable products, for covering a personnel room in flammable surroundings, as an element in fire protective suits, for covering a fire engine, for extinguishing car fires and similar, as a rescue tent, as a cover for a fire wall, and for similar fire protection purposes.

11. A fire and heat protective web equipped with means for feeding liquid to the web, wherein a cooling-effect is established, the protective web comprising, in a cross section view from the heat exposed side:

a selected first support layer (1) consisting of a steam permeable, compact and tear resistant textile material, one or more fluid conducting layers (2) of a liquid permeable and airy textile material, and at least one conduit (6) mounted in fluid communication with at least one fluid conducting layer for supply of fluid to the fluid conducting layer and to disperse the fluid evenly in the longitudinal extent of the web, whereby the different layers are tightly connected surface-to-surface.

12. Web according to claim 11, wherein said web further comprises an impermeable foil layer attached to the outside surface of said fluid conducting layer, thereby making the foil the farthest surface from the heat exposed surface of the web.

* * * * *